April 21, 1942. P. E. MEYER 2,280,249
METHOD OF FORMING A LAMINATED PRODUCT
Filed Dec. 17, 1937
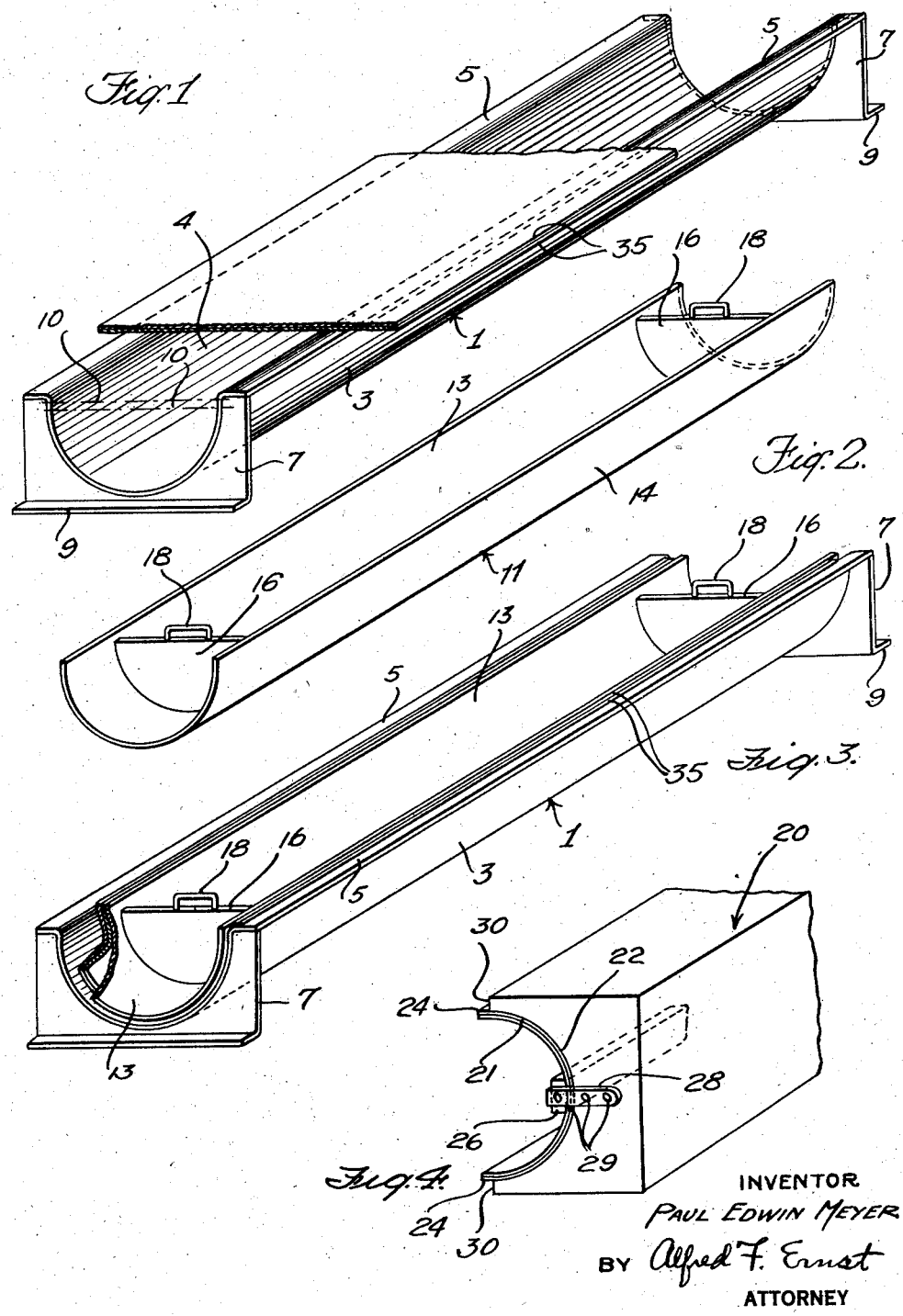
INVENTOR
PAUL EDWIN MEYER
BY Alfred F. Ernst
ATTORNEY Patented Apr. 21, 1942

2,280,249

UNITED STATES PATENT OFFICE 2,280,249

METHOD OF FORMING LAMINATED PRODUCT

Paul Edwin Meyer, Kenmore, N. Y., assignor to Certain-teed Products Corporation, New York, N. Y., a corporation of Maryland Application December 17, 1937, Serial No. 180,345

2 Claims. (Cl. 154—2)

This invention relates to the production of products having a predetermined form and composed of laminae. The invention especially relates to a laminated product having curviform surfaces. The invention particularly relates to a product composed of laminated sheets of fibrous material flexed to curviform outline or section and maintained in this form by virtue of the adhesive between the sheets.

The invention utilizes sheets having the quality of being flexible so that they may be flexed or bent into curviform shapes, but also having a resistance to flexure so that they tend to and may substantially resume their flat sheet form. Curviform fibrous products, such as fibre board, including fibre boards which are of the character and composition commonly used as wallboards as well as those containing wood fibre, such as ground wood fibres, and also including such wallboards when made with a plurality of plies felted together or with layers composed of such plies adhesively bound together to secure the desired thickness of the board, are the subject of the invention.

The forming of flexible sheets of paper or other fibrous material into shapes or forms having a curviform surface is susceptible of many variations by well known methods. It has been proposed, for example, to laminate two flexible sheets, such as two sheets of fibre board, between which an adhesive is placed to hold the sheets in face to face contact, the curviform shape, such as that of a semi-cylindrical surface, being obtained by flexing the two sheets with the adhesive therebetween and in face to face relation and by then setting the edges of the flexed sheets against cleats suitably fastened to a support so that the pressure of the edges of the sheets as they tend to return to their flat condition is resisted by the cleats. It also has been proposed to wrap a sheet upon a mandrel in coils while applying adhesive between the coils or layers thus formed. By such methods, some of which partake of the nature of hand operations, a product may be produced which, after release from the cleats or after being slit to remove from the mandrel, will retain a curviform shape. Such methods require that the sheets be handled with care before the adhesive is set and various factors, such as the degree of flexibility of the board, the uniformity of the thickness of the sheet and the care with which the adhesive is applied to the faces thereof and other factors, may cause a product to be produced which is not true to form and in which the sheets are not firmly bound together and tend to separate.

The present invention purposes to improve the product which is made by laminating a plurality of sheets, particularly those of fibrous structure, with adhesive therebetween when formed into a curviform shape. The invention has particular application to flat sheets of this kind which, while flexible and capable without breaking of being bent into curved forms of relatively small radius, are of such thickness and have such substantial resistance to flexure that they are capable substantially of resuming their flat sheet form when released from flexure. The invention proposes, as heretofore, to laminate the sheets with the adhesive therebetween and before the adhesive is set to bend or flex the sheets thus laminated into the desired curved form. The invention, however, aims to improve the quality of the product both in accuracy of form and in the capacity to retain the desired form after setting of the adhesive and after being in use a considerable length of time, as well as to secure a product in which the laminae do not separate.

To this end, according to the present invention, after the sheets have been placed face to face with the adhesive therebetween, a distributed prssure is applied to the exterior faces of the assembled sheets so that the faces between which the adhesive is applied are pressed into uniform contact with each other while said sheets are maintained in the flexed and curved position true to a predetermined form. This distributed pressure is sufficient to overcome the resistance of the sheet to flexure and to hold the sheets firmly together substantially throughout the contacting surfaces. Moreover, the invention provides for the maintenance of this distributed and preferably substantially uniform pressure between the sheets until the adhesive substantially is set to the degree where it will maintain the predetermined curviform shape of the laminated product.

This use of distributed and uniformly applied pressure is in contrast to the prior art methods which utilize the pressure resulting from a certain amount of tension created in the sheets in flexing them to the curved form. Such pressure cannot be relied upon to press the sheets together and to maintain all portions of the laminae in contact and adhering together. Moreover, this uniform distributed pressure constitutes a further step in the art of securing laminated products of curved form by use of a mold or die as compared with the prior art method which molds or presses sheets which have no substantial resistance to flexure or those which are intended to be held in contact only at spaced points, as in the case of certain insulating materials. The uniform and distributed pressure holding the laminae in close contact and maintaining this contact and true shape until the adhesive is set results in a product which will maintain its true form.

In order to accomplish this result the invention utilizes a mold or die or other shaping device having a curviform surface against which or into which the sheets as they are flexed may be pressed. In order to secure the desired distribution of the pressure over the face of the sheets, and particularly to bring this distributed pressure upon the faces of the sheets which are in contact with the adhesive laminated therebetween, the invention utilizes a cope member or counter mold or male die which has a curviform surface suitably corresponding to that of the mold or female die so that in consideration of the thickness of the sheets which are to be pressed together the pressure thus applied to the sheets is distributed over the sheets preferably uniformly and is carried through the sheets between the counter surfaces and the curved surface of the mold.

The invention will be further described in connection with the drawing which represents the mold and the countermold for a product having a particular curved, that is, cylindrical form. It will be understood that other curviform shapes may be made by suitably designing the mold and the corresponding counter mold so as to produce a particular curviform surface therein into contact with which the sheets laminated together with the adhesive therebetween may be pressed before the adhesive has set.

Fig. 1 represents a perspective view of the mold with sheets to be formed lying thereon, said sheets being broken away to reveal the mold.

Fig. 2 represents a perspective view of the cope member or counter mold.

Fig. 3 shows a pair of sheets of material laminated together and held in curviform shape between the counter mold and the mold.

Fig. 4 shows a trimming jig or form.

In the particular embodiment of the invention illustrated in the drawing the mold 1, which may be constructed, for example, of sheet metal of suitable kind and thickness, is provided with a part 3 which may be made by bending a sheet of metal into semi-cylindrical form. In the particular example illustrated, the radius of this cylinder at the inside surface thereof may be 9¼". Preferably, also, in order to secure stiffness in the mold, this sheet is provided with portions 5 which are bent as flanges extending adjacent the diameter of the semi-circle of the mold. At the ends of the mold, which in the particular embodiment illustrated may be 8'6" long, are fastened cradle members 7 which also may be made of sheet metal having a semi-circular segment removed therefrom into which the outer surface of the sheet 3 of the mold may fit so as to be fastened thereto, for example by welding. The cradle members 7 are provided with flanges 9 which serve to stiffen these members crosswise of the length of the mold as well as to provide feet for the mold as a whole so that it may rest upon a floor or other surface.

In Fig. 2 is shown the cope member or counter mold 11 which may have a part 13 made of sheet metal bent or formed in semi-cylindrical shape. The radius of curvature of the outer face of this sheet may be, for example, 9" to correspond with the mold illustrated in Fig. 1. There may thus be provided between the outer surface 14 of the cope member 11 and the inner surface 4 of the mold a space of ¼" when the axes of the cylindrical surfaces are coincident. In this space the flexed sheets may be held and may be pressed together as shown in Fig. 3 when the cope member or counter mold 11 is pressed down upon the sheets to hold the underside of the sheets firmly against the surface 4 of the mold.

In order to hold the metal sheet 13 in its proper curviform shape, adjacent the ends of the sheet are placed the transverse stiffening members 16 which may be of sheet metal and which may be fastened to the sheet 13, for example, by welding. If desired in some cases, additional stiffening members 16 may be placed along the cylinder. If the sheet 13, however, is of substantial thickness, two stiffening members as illustrated in Fig. 2, may be sufficient for a countermold male die having the dimensions similar to that shown. The members 16 may be provided with suitable handles 18 for convenience in inserting and lifting the cope member 11 into and out of the mold. With certain materials, such as flat sheets for making laminated wallboards of fibrous structure, which sheets for example may have a thickness of about ⅛", the laminated product of curviform shape may be made by laying two such sheets 35 one upon the other with adhesive therebetween and placing these sheets together upon the flanges 5 of the mold 1 and spanning from one flange to the other as shown in Figure 1. When these sheets are of the desired length, say 8', to suit the length of the mold and of the desired width corresponding to or somewhat in excess of the circumference of the half cylinder of the mold, the cope member or counter mold 11 may be set upon these sheets thus laid adjacent the center of their width in order to press them down into contact with the inner surface 4 of the mold. It has been found, in forming laminated materials of the flexible fibrous structure referred to, that the weight of the cope member or counter mold 11, when constructed as described above and with metal or other material of sufficient density, in some cases is sufficient to hold these sheets into contact with the surface 4 and with the upper faces thereof in contact with the face 14 of the countermold so that, under the pressure distributed over the surfaces of the sheets the sheets are pressed together with a distributed pressure on the faces thereof which are in contact with the adhesive. The sheets are thus held firmly in the shape which conforms to the surface of the mold and its countermold and when the adhesive is set, because of the pressure placed upon the inner surface of the sheets so that all the adhesive is available to hold them together at all parts thereof, the product, upon removal from the mold, retains the curviform shape established by the mold and separation of the laminae from each other is prevented.

In order to secure accuracy of the semi-circular shape of the finished product, preferably the width of the sheets before they are set in the mold is somewhat greater than the circumference of the semi-cylindrical surface of the mold. As will hereafter be described, the excess material may be trimmed from the sheets after the adhesive has set and after the product has been removed from the mold. In order, however, properly to handle the sheets in the forming operations, the part 3 of the mold 1 may be made with portions 10 of the surface thereof tangential to the semi-cylindrical surface 4. These portions 10 may extend upwardly parallel to each other about 1½" above the diameter of the semi-circle of the mold and may have their upper part rounded to become tangential to the flange 5. These rounded parts serve to enable the sheets as they are pressed down into the mold by the cope member readily to slide over said rounded parts without breaking or cutting the surfaces of the flexible sheets such as might occur if a sharp edge were formed between the flange 5 and the surface 4. After the material is pressed down into the mold the edges of the sheets therefore will extend upward generally tangential to the curve of the sheet for about this distance of about 1½".

These marginal portions represent the material which may be trimmed off after the adhesive has set in the molded product. For this purpose a form 20, diagrammatically shown in Fig. 4, may be used into which the molded product 21 may be set with its curved surface in contact with the curved surface 22 of said form. The portions 24 of the molded product extend beyond the diameter of the semi-circle of the surface 22. In order to hold the molded product in the form 20 a strip or batten 26 may be placed extending lengthwise of the mold and held at its ends by a bracket 28 fastened by suitable fasteners 29 to the body of the form 20 and to the batten 26, a bracket 28 and a fastener 29, not shown, being also provided at the opposite end of the form. The edges 24 which project beyond the semi-circle of the form may then be removed, for example, by running thereagainst along the edge 30 of the form with the molded product therein a saw or other cutting or machining device.

It is a feature, however, of the invention that the product is molded or formed in a mold which has surfaces which are extensions of the molding surface and which may take the bearing of excess marginal material on the sheets which are molded in their laminated relation to each other. The particular apparatus shown in the drawing is merely illustrative and variations may be made without departing from the spirit of the invention which provides a process such as may be carried out in a mold having a corresponding cope member or counter mold which will take the bearing of the faces of the sheets to be laminated and will distribute the pressure as described. While this pressure in the particular embodiment described is secured by virtue of the weight of the cope member itself, within the scope of the invention this cope member may be so constructed as to be stiff or rigid and to take and to transmit to the sheets a pressure applied to said cope member from an external source.

Having thus described the invention I now claim:

1. Method of producing from sheet material a cylindrical product which comprises laminating with an adhesive therebetween which is capable of setting a plurality of flat sheets of fibre board each having a thickness of the degree of ⅛" but capable of flexure to a cylindrical shape in a semi-circular arc though having a resistance to flexure which is capable of substantially restoring said sheet to its flat form upon release from flexure, flexing said sheets in contact with each other substantially without exceeding said resistance thereof into said semi-circular cylindrical shape while said adhesive is in unset condition so that said sheets can slip relative to each other and independently take shape while maintaining contact with each other, applying a pressure substantially uniformly distributed upon the faces of said flexed sheets to press them together, and maintaining the sheets in said flexed condition under said pressure until said adhesive substantially has set.

2. Method of producing from sheet material a cylindrical product which comprises laying upon a mould of cylindrical shape with its surface in a semi-circular arc with an adhesive therebetween which is capable of setting two flat sheets of fibre board each having a thickness of the degree of ⅛" but capable of flexure to said cylindrical shape though having a resistance to flexure which substantially is capable of restoring said sheet to the flat unflexed form upon release from flexure, flexing said sheets in contact with each other substantially without exceeding said resistance thereof into said cylindrical shape by pressing a countermould of complementary cylindrical shape upon the face of the sheets to force them into the depression of the mould while said adhesive is in unset condition so that said sheets can slip relative to each other and independently take shape in the mould while in contact with each other, applying pressure upon said counter-mould distributed upon the faces of the sheets to press them together and to maintain said sheets flexed and in contact and conforming to the form of the mould substantially until said adhesive has set.

PAUL EDWIN MEYER.